US012586013B2

(12) United States Patent
Kim

(10) Patent No.: US 12,586,013 B2
(45) Date of Patent: Mar. 24, 2026

(54) SYSTEMS AND METHODS FOR JOINT OPTIMIZATION OF ASSIGNMENTS

(71) Applicant: Allstate Insurance Company, Northbrook, IL (US)

(72) Inventor: Jin H. Kim, Northbrook, IL (US)

(73) Assignee: Allstate Insurance Company, Northbrook, IL (US)

( * ) Notice: Subject to any disclaimer, the term of this patent is extended or adjusted under 35 U.S.C. 154(b) by 108 days.

(21) Appl. No.: 18/543,262

(22) Filed: Dec. 18, 2023

(65) Prior Publication Data

US 2025/0200468 A1      Jun. 19, 2025

(51) Int. Cl.
*G06Q 10/0631* (2023.01)
(52) U.S. Cl.
CPC .............................. *G06Q 10/06312* (2013.01)
(58) Field of Classification Search
None
See application file for complete search history.

(56) References Cited

U.S. PATENT DOCUMENTS

| | | | |
|---|---|---|---|
| 5,421,013 A | 5/1995 | Smith | |
| 9,916,584 B2 | 3/2018 | Vayghan et al. | |
| 10,339,486 B1 | 7/2019 | Price et al. | |
| 2006/0047551 A1 | 3/2006 | Cotten et al. | |
| 2011/0184771 A1 | 7/2011 | Wells | |
| 2014/0149178 A1 | 5/2014 | Hedges | |
| 2021/0065114 A1* | 3/2021 | Thompson ......... | G06Q 10/1093 |
| 2021/0237269 A1* | 8/2021 | Hvass ................... | B25J 9/1674 |

* cited by examiner

*Primary Examiner* — George Chen
(74) *Attorney, Agent, or Firm* — Dinsmore & Shohl LLP

(57) ABSTRACT

Methods and systems for entity assignment to assign an entity of a plurality of entities to a lead resource of at least two lead resources may include receiving a score for each entity of the plurality of entities. The method may further include determining a ranking of the plurality of entities based upon the score for each entity and receiving a distance between each entity of the plurality of entities and each lead resource of the at least two lead resources, wherein the plurality of entities are greater in number than the at least two lead resources. The method may also include applying an optimization algorithm based on the ranking and the distance between each entity and each lead resource and updating the optimization algorithm in real-time until each entity of the plurality of entities is paired to one of the at least two lead resources.

4 Claims, 12 Drawing Sheets

100

102

107

104, 105

700a

702

704, 705

707

708, 706

SYSTEMS AND METHODS FOR JOINT OPTIMIZATION OF ASSIGNMENTS

TECHNICAL FIELD

The present specification generally relates to assignment management systems and methods and, more specifically, systems and methods for assigning agencies to lead resources optimized on the basis of distance and score-based agency rankings.

BACKGROUND

Businesses may have a collection of related agencies or entities such as subsidiaries, franchises, affiliates, and the like. In some industries, each agency may have various resources, such as salespeople. While an agency may further be associated with a field sales leader ("FSL"), also known as a lead resource, the FSL may be associated with other agencies as well. In this way, an FSL may oversee multiple agencies. At times, an FSL may be assigned one or more outlier agencies that are located far from the other agencies that they oversee. Therefore, a need exists to more efficiently and effectively allocate assignment of agencies or entities to FSLs or other such lead resources.

SUMMARY

In accordance with one embodiment of the present disclosure, an entity assignment system to assign an entity of a plurality of entities to a lead resource of at least two lead resources may include one or more processors, one or more memory components communicatively coupled to the one or more processors, and machine readable instructions stored in the one or more memory components. The machine readable instructions may cause the entity assignment system to perform at least the following when executed by the one or more processors: receive a score for each entity of the plurality of entities, determine a ranking of the plurality of entities based upon the score for each entity, and receive a distance between each entity of the plurality of entities and each lead resource of the at least two lead resources, wherein the plurality of entities are greater in number than the at least two lead resources. The machine readable instructions may further cause the entity assignment system to apply an optimization algorithm based on the ranking and the distance between each entity and each lead resource, and update the optimization algorithm in real-time until each entity of the plurality of entities is paired to one of the at least two lead resources.

In accordance with another embodiment of the present disclosure, a method for entity assignment to assign an entity of a plurality of entities to a lead resource of at least two lead resources may include receiving a score for each entity of the plurality of entities, and determining a ranking of the plurality of entities based upon the score for each entity. The method may additionally include receiving a distance between each entity of the plurality of entities and each lead resource of the at least two lead resources, wherein the plurality of entities are greater in number than the at least two lead resources. The method may also include applying an optimization algorithm based on the ranking and the distance between each entity and each lead resource, and updating the optimization algorithm in real-time until each entity of the plurality of entities is paired to one of the at least two lead resources.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
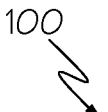
FIG. 1 depicts a schematic illustration of instances of agencies as entities represented by circles assigned on a map to FSLs as lead resources with a schematic location represented by a triangle and a specific FSL represented by a number within a circle, according to one or more embodiments shown and described herein.

In supply chain assessments, underlying agencies or units (such as transportation carriers or other entities) may be assigned to lead units (such as a leader or reporting division as a lead resource). For example, insurance companies may assign entities such as agencies to a field sales leader (FSL) based on distance. The algorithms described herein further optimize such assignments and are directed to optimization of assignment of an agency or underlying unit to a leader such as an FSL leader based on distance and agency scores, as the scores may be key performance indicator (KPI) scores associated with each agency. Metrics that can be used to determine an insurance agency's KPI scores include new customer quoting per household, close rate, new auto customer retention, auto to property linked quoting, and/or quote count per licensed staff. Based on the KPI scores, bundles of agencies may be placed into respective bins. For example, for 20 agencies including scores, 4 bins may be used. The first bin may represent the top 5 scoring agencies, the second bin may represent the next top 5 scoring agencies, the third bin may represent the next top 5 scoring agencies, and the fourth bin may represent the 5 lowest scoring agencies. As described in greater detail further below, the optimization algorithms described herein may analyze the agencies bin by bin to ensure an generally equal distribution of similar scoring agencies across FSL assignments.

Lead resource entity assignment such as for market realignment can be quick and automatic based upon a lead resource departure, regional changes, annual realignment, etc. As future consultations by lead resources (e.g., FSLs) at their respective entities (e.g., agencies) may become more virtual over time, lead resource entity assignment as described herein can help all lead resources be more efficient, such as through better utilization of consultation time with assigned entities.

In embodiments described herein, an entity assignment system is configured to implement systems and methods to assign entities to lead resources in an optimized manner. Entities may be assigned to bins based upon the location and/or score range of each bin. One of several algorithms may be applied to assign entities (such as agencies) to lead resources, such as the FSL Nearest Agency (FNA) algorithm, the L-FSL Nearest Agency (LFNA) algorithm, the Nearest Agency Nearest FSL (NANF) algorithm, or the Far Near (FN) algorithm, which are respectively described in greater detail further below. In this way, the assignment or reassignment of entities to lead resources may be performed based upon the type of algorithm implemented, along with the choice of assignment of entities by location, score, or a weighted combination. As such, the lead resource entity assignment may have some flexibility in optimization of distance versus KPI scores while constraining lead resources in a region to oversee the same number of entities. Using the FN algorithm and selecting optimization, for example, each lead resource can have consistency in the number of entities and control of the distribution of the KPI-scored entities they oversee.

Accordingly, entity assignment systems and methods as provided herein to assign an entity 102 of a plurality of entities 102 (FIG. 1) to a lead resource 104 of at least two lead resources 104 may include receiving a score for each entity 102 of the plurality of entities 102, determining a ranking of the plurality of entities 102 based on a score for each entity 102, receive a distance between each entity 102 of the plurality of entities 102 and each lead resource 104 of the at least two lead resources 104, wherein the plurality of entities 102 are greater in number than the at least two lead resources 104, applying an optimization algorithm based on the ranking and the distance between each entity 102 and each lead resource 104, and updating the optimization algorithm in real-time until each of the plurality of entities 102 is paired to one of the at least two lead resources 104. In embodiments, each of the plurality of entities may be paired to at least one of the at least two lead resources 104. In embodiments, systems and methods as described herein may optimize entity assignments to lead resources according to entity scores, entity proximity, and/or a weighted combination thereof. These and additional features will be described in greater detail below. Based on the ranking of the plurality of entities 102, each entity 102 may be placed into a plurality of bins, as will be described in greater detail further below, each bin associated with a ranking range level progressing from a highest to lowest ranking range, and the optimization algorithm may be applied based on the ranking range level.

Referring to FIG. 1, in embodiments, a given area may have multiple lead resources and a greater quantity of entities, such that each lead resource is assigned to multiple entities. As depicted in the region 100 depicted in FIG. 1, each entity 102 may be labeled, for illustrative purposes, with an identifier of a particular lead resource 104. For example, all entities 102 assigned to FSL4 are each labeled with a '4' and are encircled merely to illustrate this grouping of all entities 102 assigned FSL4. A triangle or any other suitable indicator may be utilized to depict the location 105 of a particular lead resource 104. In FIG. 1, the triangle of the location 105 may be reflective of any of lead resources 104 depicts as numbers 1-8 in FIG. 1 (i.e., any of number 1-8 within circles depicting entities 102 means a specific lead resource 104 assigned to the entity 102, such as a FSL1 as a lead resource 104 assigned to any entities 102 including a number 1 in the circle or a FSL 8 as a lead resource 104 assigned to any entities 102 including a number 8 in the circle. The location 105 can be schematically indicative of any of the lead resources 104, such as any of FSL1-FSL8. A market 107 depicts a market of entities 102, such as within a compact geographical area, assigned to a particular lead resource 104 (such as FSL 4 in FIG. 1). Any other locations, lead resources, entities, or markets described herein are similarly depicted. In this embodiment, the triangle is only shown here for illustrative purposes and is not depicted onscreen. In other embodiments, this type of location 105 depiction may be graphically shown. In other embodiments, any other type of indication may be utilized (color, letter/word, size, and the like) to indicate the lead resource 104 to which an entity 102 is assigned. In some embodiments, the number of entities 102 per lead resource 104 may be equal (or nearly equal if the number of entities 102 is not evenly divisible by the number of lead resources 104) or may vary among lead resources 104 for a variety of reasons (skill/experience level of each lead resource 104, size of each entity 102, score of each entity 102 as discussed further herein, and the like). In other embodiments, the number of entities 102 assigned per lead resource 104 may be within a range/band (e.g., 15-30 entities per lead resource). While entities 102 and lead resources 104 are discussed in this embodiment, the description herein may apply to any suitable type of organizations, such as, by way of non-limiting examples, warehouses, retail stores, distribution centers, food centers, grocery stores, and the like.

Entities 102 may be reassigned to other lead resources 104 on a group or individual basis, or there may be a fresh reassignment from scratch of all entities 102 to lead resources 104. This may be due to personnel changes among lead resources 104 and/or within entities 102, such as personnel joining or departing an organization, transferring within the organization to another entity, market, state, jurisdiction, closure of an entity, opening a new entity, and the like. In terms of entity assignment/reassignment, a proximity-based approach for lead resource entity assignment works well when most entity (e.g., agency) consultations are held in person by the lead resource 104. This can save driving time, for example, and makes face to face meetings easier to facilitate. However, with increasing utilization of technology and a shift towards virtual consultations, other considerations may be utilized. In this embodiment, a key performance indicator (KPI) score may be utilized to measure the overall growth potential for an entity. In this embodiment, KPI scores range from 0 representing the lowest potential entity to 10 representing the highest potential entity. For a given region, such as the region 100 depicted in FIG. 1, the current lead resource entity assignment has both a wide spread of the number of entities 102 that a lead resource 104 oversees and also a wide and uneven distribution of entity KPI scores. This can be seen in Table 1 below, which shows the number of entities and the mean KPI scores for each lead resource in the region 100.

TABLE 1

| FSL | # of Agencies | KPI mean |
|---|---|---|
| 1 | 16 | 2.50 |
| 2 | 33 | 1.72 |
| 3 | 24 | 2.39 |
| 4 | 22 | 2.83 |

TABLE 1-continued

| FSL | # of Agencies | KPI mean |
|---|---|---|
| 5 | 16 | 1.34 |
| 6 | 23 | 3.93 |
| 7 | 13 | 2.18 |
| 8 | 27 | 3.16 |
| 9 | 17 | 4.43 |
| 10 | 20 | 3.26 |
| 11 | 21 | 2.45 |
| 12 | 24 | 3.96 |
| 13 | 20 | 3.42 |
| 14 | 17 | 4.26 |
| 15 | 18 | 4.83 |
| 16 | 25 | 3.52 |
| 17 | 20 | 4.00 |
| 18 | 20 | 3.98 |

The KPI score for each entity 102 may be influenced by a number of factors including geography, the number of entities 102 that a lead resource 104 oversees, the quality and frequency of lead resource consultations, etc. It is a technological challenge to create a lead resource entity assignment that is consistent and fair in terms of distance, number of entities, and KPI scores for all lead resources 104. Along with increasing virtual consultations and the introduction of KPI scores, the algorithms discussed herein may be utilized to create a more fair and consistent lead resource entity assignment within a given region 100.

As discussed above, the quantity of entities 102 that each lead resource 104 oversees may be a consideration in a lead resource entity assignment. For example, a lead resource 104 may have had fewer entities 102 when the entities 102 are farther out forming a sparse cluster (entities labeled '8' in FIG. 1) versus a compact cluster (entities labeled '2' in FIG. 1). This makes sense using a proximity approach, as the time traveled for the sparse cluster would take longer. However, with other considerations, such as increasing virtual consultations, each lead resource 104 in a region may be constrained to oversee the same number of entities 102, which can level the playing field for lead resources in each region in some embodiments.

In embodiments, the objective may be for each lead resource 104 to see the same number of agencies while optimizing for proximity versus an even distribution of KPI-scored agencies. This may be done by ranking all the 102 by KPI scores from lowest to highest and then bucketing them into bins. For example, given N=18 FSLs and M=376 agencies, where M>>N, this can be optimized on an even distribution of KPI scores (instead of proximity). 21 bins can be created, where bin 1 contains the 18 lowest-ranked KPI scored agencies, bin 2 contains the 19-36th lowest ranked KPI scored agencies, and so forth, with the last bin 21 containing the 16 highest ranked KPI scored agencies. Each lead resource 104 may then be assigned an agency from each bin such that the lead resources 104 are each assigned 21 agencies, except for two FSLs that are assigned 20 agencies. This approach may ensure an even distribution of KPI scored agencies to each lead resource 104. The discussion below with respect to FIGS. 2-5 explains in detail how to assign an agency to a lead resource 104 for a given bin.

Figure 2:
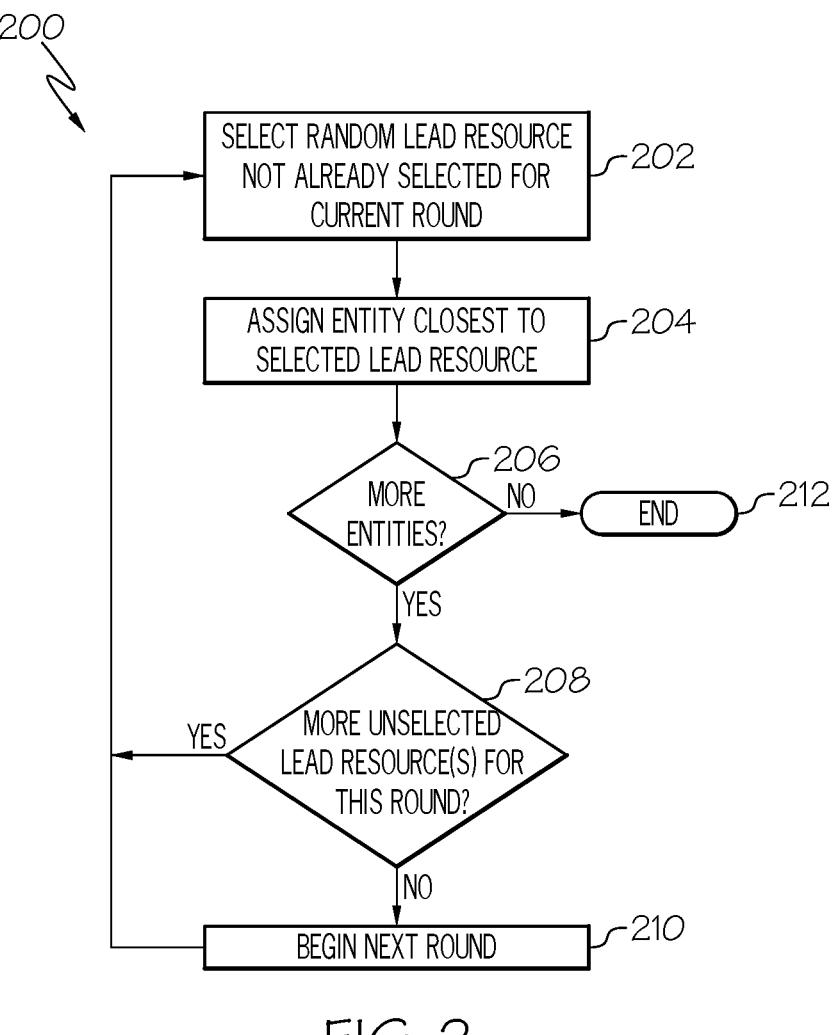
FIG. 2 depicts a process flow to assign entities (e.g., agencies) to lead resources (e.g., FSLs) utilizing a first algorithm such as an FSL Nearest Agency (FNA) algorithm, according to one or more embodiments shown and described herein.

Referring now to FIG. 2, a FSL Nearest Agency (FNA) entity assignment flow 200 shows entities being assigned to lead resources according to the FNA algorithm. In embodiments, the FNA algorithm begins by selecting a random FSL from the N FSLs and M agencies (with M>N) and determines which agency is closest to it and selects that agency. Then another random FSL is selected from the remaining FSLs, and its closest agency is selected from the remaining agencies. This process is repeated until the last FSL of the randomly selected N FSLs is paired with the final agency of the M agencies.

Thus, a first iterative process may be initiated as the optimization algorithm by selecting a first lead resource 104 from the at least two lead resources 104 at random. The FNA algorithm begins at block 202 by selecting a random available FSL from among FSLs not already selected in the current round.

A closest entity 102 may be identified as the entity 102 of the plurality of entities 102 that is closest to the first lead resource 104, and the closest entity 102 may be paired with the first lead resource 104. The FNA algorithm continues to block 204 to determine which unassigned entity is closest to the selected FSL and assigns that entity to the selected FSL. If there are no additional unassigned entities at block 206, the FNA algorithm terminates at block 212. Otherwise, if there are still additional unassigned entities, then the FNA algorithm proceeds to block 208 where the FNA algorithm determines whether there are more unselected FSLs in the current round. If at block 208 there are more unselected FSLs in the current round, then the FNA algorithm returns to block 202 to select the next random unassigned lead resource within the current round. Thus, a second lead resource 104 may be selected from the at least two lead resources 104, an updated closest entity 102 may be identified the entity 102 of the plurality of entities 102 that is closest to the second lead resource 104 and paired with the second lead resource 104, and the first iterative process may be repeated until each of the plurality of entities 102 is paired with at least one lead resource 104 of the at least two lead resources 104.

If there are no other unselected lead resources in the current round at block 208, then the next selection round begins at block 210 and then the FNA algorithm returns to block 202. Thus, the FNA algorithm is repeated until the last lead resource is paired with the final entity.

Figure 3:
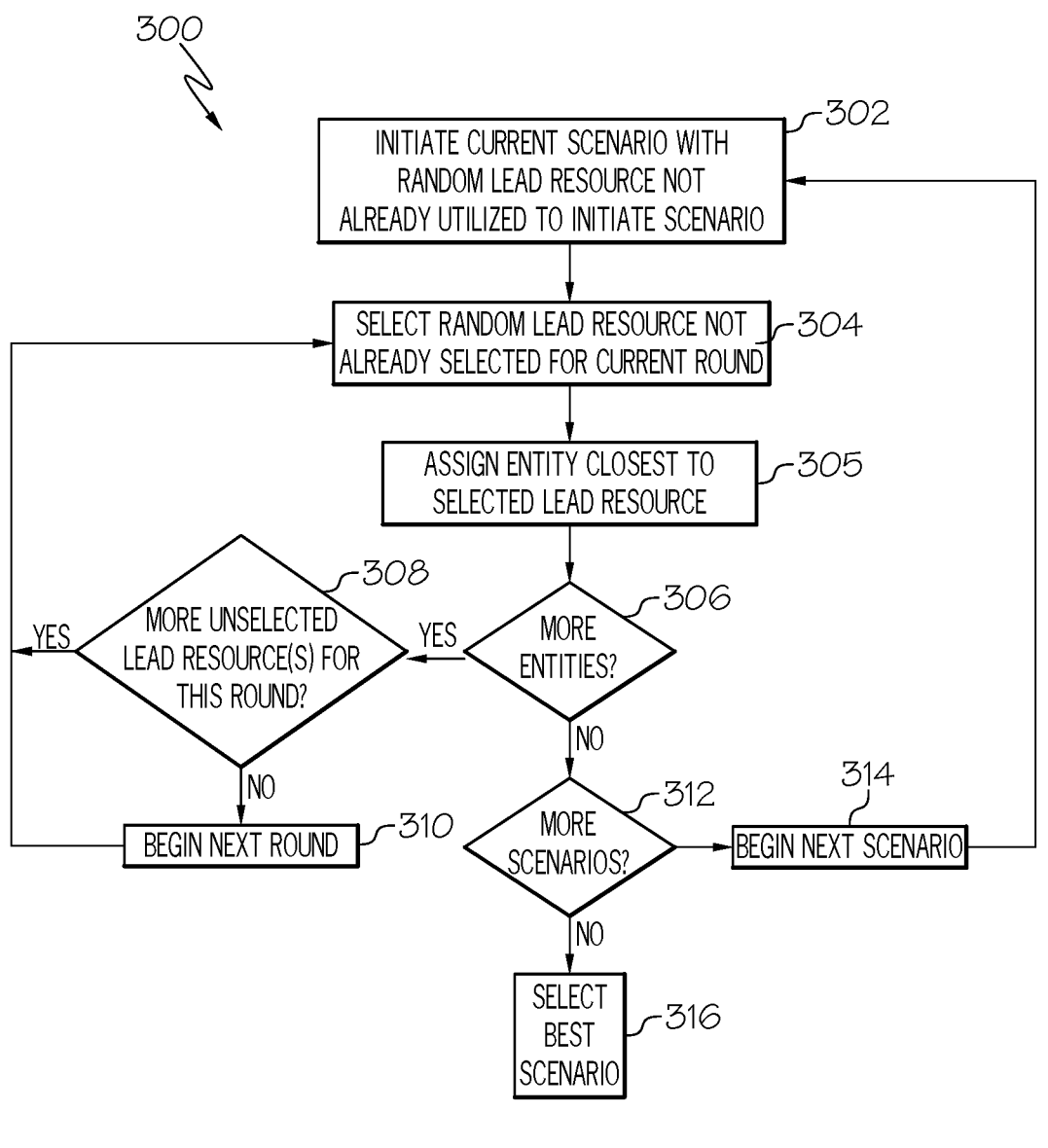
FIG. 3 depicts a process flow to assign entities to lead resources utilizing a second algorithm such as an L-FSL Nearest Agency (LFNA) algorithm, according to one or more embodiments shown and described herein.

Referring now to FIG. 3, an L-FSL Nearest Agency (LFNA) entity assignment flow 300 shows entities being assigned to lead resources according to the LFNA algorithm, in which L may be used to denote the number of scenarios run. A variation of the FNA algorithm, in embodiments of the LFNA algorithm, the system chooses L=N. The system performs the FNA algorithm described above once and stores the results. Then the system performs the FNA algorithm a second time but chooses a different FSL as the first random FSL and stores the results. The system repeats this L times and chooses the best result from the L attempts.

In embodiments, the LFNA algorithm may include (i) initiating a first round of a second iterative process as the optimization algorithm by setting a value L equal to a number of the at least two lead resources 104, (ii) selecting a first lead resource 104 from the at least two lead resources 104 at random, (iii) identifying as a closest entity 102 the entity 102 of the plurality of entities 102 that is closest to the first lead resource 104, (iv) pairing the closest entity with the first lead resource 104, (v) selecting a second lead resource 104 from the at least two lead resources 104, (vi) identifying as an updated closest entity 102 the entity 102 of the plurality of entities 102 that is closest to the second lead resource 104, and (vii) pairing the updated closest entity 102 with the second lead resource 104. The second iterative process may be repeated until each of the plurality of entities 102 is paired with at least one lead resource 104 of the at least two lead resources 104 to generate a first round pairing result as a first of a plurality of round pairing results. A second round of the second iterative process may be performed a second time, selecting the first lead resource 104 from the at least two lead resources 104 as a different lead resource 104 in the second round to generate a second round pairing result as a second of a plurality of round pairing results. The second iterative process may be performed for L rounds until each lead resource 104 is the first lead resource 104 in the second iterative process to generate the plurality of round pairing results, and a best pairing result may be selected from the plurality of round pairing results of the L rounds.

Referring to FIG. 3, L=N (i.e., the number of lead resources), such that each scenario corresponds to a different lead resource serving as the initial lead resource 104 for that particular scenario. In other embodiments, utilizing increasing the number of scenarios (i.e., L>N) can increase the quality of results at the cost of increasing computational complexity. At block 302, the LFNA algorithm initiates the current scenario by selecting a lead resource 104 at random (or not random in other embodiments) from among lead resources 104 that have not already been utilized to initiate a scenario. The LFNA algorithm then selects at block 304 a random available lead resource 104 from among lead resources 104 not already selected in the current round. The LFNA algorithm continues to block 305 to determine which unassigned entity 102 is closest to the selected lead resource and assigns that entity 102 to the selected lead resource 104.

At block 306, if there are still additional unassigned entities 102, then the LFNA algorithm proceeds to block 308 where the LFNA algorithm determines whether there are more unselected lead resources 104 in the current round. If at block 308 there are more unselected lead resources 104 in the current round, then the FNA algorithm returns to block 304 to select the next random unassigned lead resource 104 within the current round. Otherwise, if there are no other unselected lead resources 104 in the current round at block 308, then the next selection round begins at block 310 and then LFNA algorithm returns to block 304. Thus, the scenario is repeated until the last lead resource 104 is paired with the final entity 102. Returning to block 312, if there are more scenarios, then the LFNA algorithm begins the next scenario at block 314, and the LFNA algorithm then returns to block 302 to utilize a random lead resource 104 for this new current scenario from among lead resources 104 that have not already been utilized to begin a scenario. Otherwise, if at block 312 there are no remaining scenarios, then at block 316 the LFNA algorithm determines the best scenario from among all the scenarios. In this embodiment, a best scenario results in optimal proximity of entities 102 to their assigned lead resources 104, although other considerations (such as KPI scores) may be utilized alone or in combination with proximity considerations, as discussed in more detail herein with respect to FIGS. 7A-C.

Figure 4:
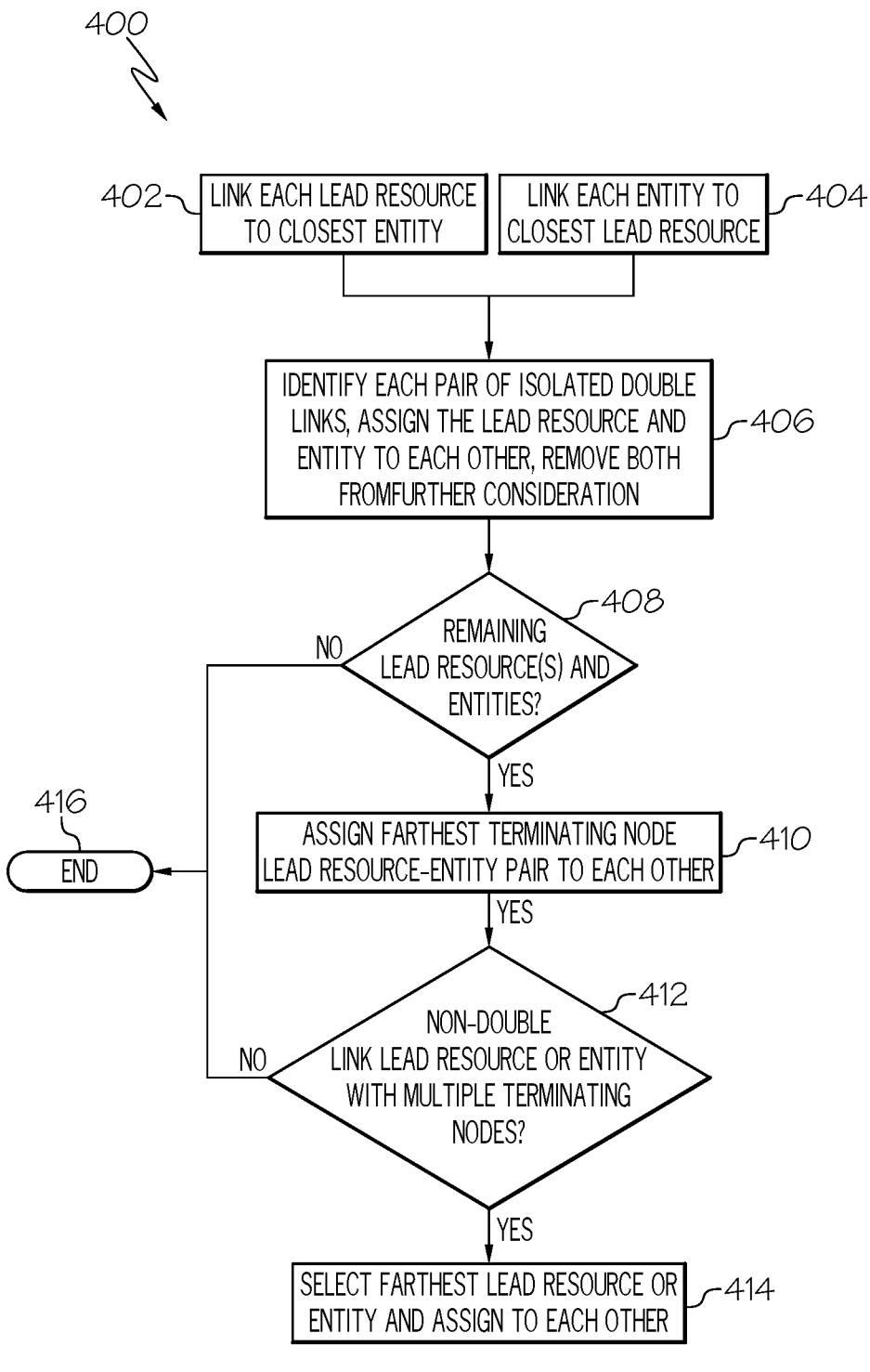
FIG. 4 depicts a process flow to assign entities to lead resources utilizing a third algorithm such as an Nearest Agency Nearest FSL (NANF) algorithm, according to one or more embodiments shown and described herein.

Referring now to FIG. 4, a Nearest Agency Nearest FSL (NANF) entity assignment flow 400 shows entities being assigned to lead resources according to the NANF algorithm. For embodiments of the NANF algorithm, each FSL is paired with their closest agency. Then each agency is paired with its closest FSL. If an FSL-agency pair is paired with each other and are not linked to any other FSL or agency, then this is called an isolated double link (DL-I), and the FSL and agency are assigned to each other. However, if there is a double link that is connected to other FSLs or agencies, those other links are followed until the link terminates. The farthest terminating node is found that is connected to the double link (DL-TN), and that farthest terminating node FSL-agency pair is assigned to each other.

If there is a non-double link FSL or agency with multiple terminating nodes, the farthest FSL or agency is selected and assigned to each other. All paired FSL-agencies are removed during the assignments in real-time to update the algorithm, and these steps are iterated until all FSL-agency pairs have been assigned.

Thus, in embodiments of the NANF algorithm, each lead resource 104 may be linked to a closest entity 102 of the plurality of entities 102, each entity 102 may be linked to a closest lead resource 104 of the at least two lead resources 104, each pair of isolated double links may be assigned based on a lead resource 104 and an entity 102 being mutually closest to each other, and each assigned pair may be removed from further consideration. For instance, at block 402, the NANF algorithm links each lead resource 104 to the closest entity. At block 404, the NANF algorithm links each entity 102 to the closest lead resource 104. Then at block 406 the NANF algorithm identifies each pair of isolated double links (i.e., where an entity identifies a lead resource as being closest to it, and the same lead resource identifies the same entity as being closest to it), also referred to as DL-I. For each pair of isolated double links, the NANF algorithm assigns the lead resource and the entity to each other and removes them each from further consideration. At block 408, if there are no additional lead resources and entities (i.e., only pair of isolated double links), the NANF algorithm terminates at block 416.

In a step (i), among remaining lead resources and entities, a farthest terminating node of a linked lead resource 104 and an entity 102 pair may be assigned to each other, and any further terminating node pair may be removed from further consideration. Thus, at block 408, if there is a double link that is connected to other lead resources 104 or entities 102, then the NANF algorithm at block 410 follows those other links until the link terminates, finds the farthest terminating node that is connected to the double link (DL-TN), and assigns that farthest terminating node lead resource-entity pair to each other.

In a step (ii), among non-double-linked lead resources 104 and entities 102 with multiple terminating nodes, a lead resource 104 and an entity 102 farthest from each other may be assigned as a non-double-linked pair, the non-double-linked pair may be removed from further consideration, and steps (i) and (ii) may be repeated until each entity 102 is assigned to one of the at least two resources 104. Thus, at block 412, the NANF algorithm determines whether there is a non-double link lead resource or entity with multiple terminating nodes. If there is not, then the NANF algorithm terminates at block 416. Otherwise, at block 414, for each of the remaining unassigned lead resources 104 and/or entities 102, the farthest lead resource 104 or entity 102 is selected and the NANF algorithm assigns them to each other, such that all paired lead resource-entities are removed and this occurs until all lead resource-entity pairs have been assigned.

Figure 5:
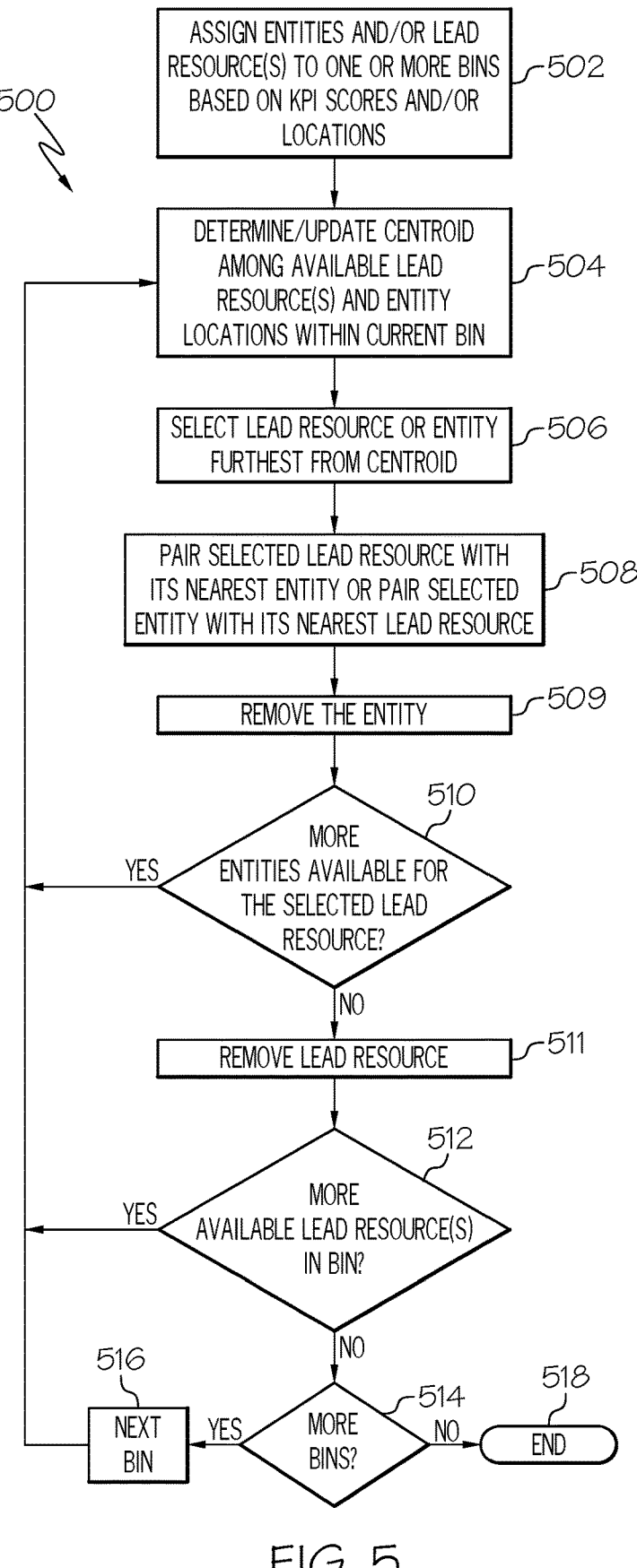
FIG. 5 depicts a process flow to assign entities to lead resources utilizing a fourth algorithm such as a Far Near (FN) algorithm, according to one or more embodiments shown and described herein.

Referring now to FIG. 5, a Far Near (FN) entity assignment flow 500 shows entities being assigned to lead resources according to the FN algorithm. The operations of any algorithm described herein, including the FN entity assignment flow 500, may be performed in real-time or otherwise. Embodiments of the FN algorithm begin by computing the centroid (such as via finding the mean of latitudes and longitudes) of all the FSLs and agency locations. Then the FSL or agency that is farthest from the centroid is found and its corresponding closest agency or FSL is selected to form an FSL-agency pair. Next, the FN algorithm determines an updated centroid from the remaining FSLs and agencies. Again, the FSL or agency that is farthest from the updated centroid is found and its closest agency or FSL selected to form another FSL-agency pair. The algorithm continues to remove the assigned pairs and determine updated centroids from remaining FSLs and agencies, repeating these steps until all FSL-agency pairs are assigned.

Thus, in embodiments of the FN algorithm, the plurality of entities 102, the at least two lead resources 104, or both may be assigned to one or more bins based on respective scores, locations, or both. In a step (i), a centroid may be determined among available lead resource and entity locations within a current bin, and a lead resource of the at least two lead resources or an entity of the plurality of entities may be selected as the selected lead resource or entity farthest from the centroid. The selected lead resource or entity may be paired with a nearest corresponding entity or lead resource, and the selected lead resource or entity, the paired nearest corresponding entity or lead resource, or both, may be removed from further availability in the current bin. The step (i) may be returned to and repeated until there are no remaining entities 102 or lead resources 104, and, based upon no remaining entities or lead resources in the current bin, a next bin may be assigned as the current bin and the step (i) returned to for repeating until no further bins remain.

Thus, at block 502, the FN algorithm may assign entities to bins based upon their KPI scores, locations, or a combination of both. Lead resources may be assigned to bins directly based upon lead resource location/area, previously-assigned entities, and the like. Once the bin assignments have completed, then at block 504 the FN algorithm determines (or updates) a centroid based upon the locations of all entities and lead resources within the bin. A centroid may be based upon the mean of latitudes and longitudes of all lead resources and entity locations within a bin, although any suitable methodology may be utilized for determining a centroid.

At block 506, the FN algorithm may select the entity or lead resource farthest from the centroid within the bin. At block 508, the FN algorithm may then pair the selected entity with a corresponding lead resource closest to the selected entity or pair the selected lead resource with a closest corresponding entity closest to the selected lead resource. Specifically, if an entity is selected as being farthest from the centroid, then the entity is paired with the closest lead resource within the bin. Alternatively, if a lead resource is selected as being farthest from the centroid, then the lead resource is paired with the closest entity within the bin. Either way, the entity may then be removed at block 509 by the FN algorithm which proceeds to block 510. If at block 510 there are more entities available for the selected lead resource, then the FN algorithm returns to block 504 to update the centroid based upon the remaining entities. Otherwise, if at block 510 there are no entities remaining for consideration, then the FN algorithm proceeds to remove the selected resource at block 511. If at block 512 the FN algorithm determines that there are more lead resources remaining for consideration within the bin, then the FN algorithm returns to block 504 to update the centroid based upon the remaining lead resources. Otherwise, if at block 512 there are no lead resources remaining for consideration, then the FN algorithm proceeds to block 514 to determine whether there are more bins. If there are more bins, then the FN algorithm proceeds to block 516 to proceed to the next bin, and then returns to block 504 to determine a centroid for the new current bin. Otherwise, if it is determined by the FN algorithm at block 514 that there are no additional bins, the FN algorithm terminates at block 518.

In embodiments, the optimization algorithm may be optimized for proximity between entities 102 and lead resources 104 or may be optimized for entity scores. The optimization algorithm may be optimized for a weighted combination of entity scores and proximity between entities 102 and lead resources 104. The optimization algorithm may be further configured to reduce an average distance among respective distances from each lead resource 104 to an entity 102, and the optimization algorithm may be further configured to reduce variation of these respective distances within each bin.

Figure 6A:
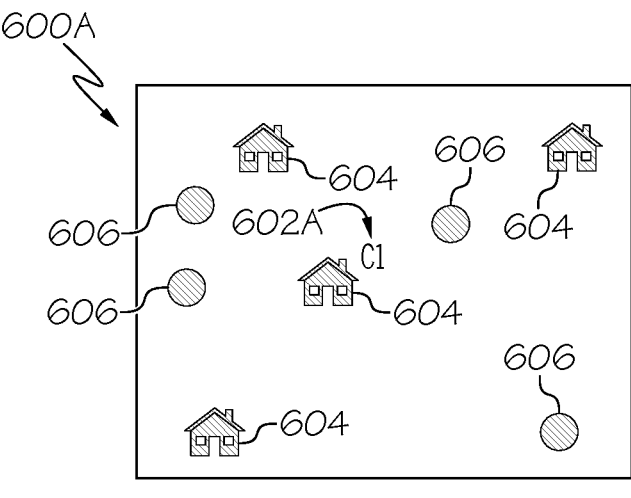
FIG. 6A depicts a centroid computed among various FSL and entity locations using the FN algorithm of FIG. 5, according to one or more embodiments shown and described herein.
Figure 6B:
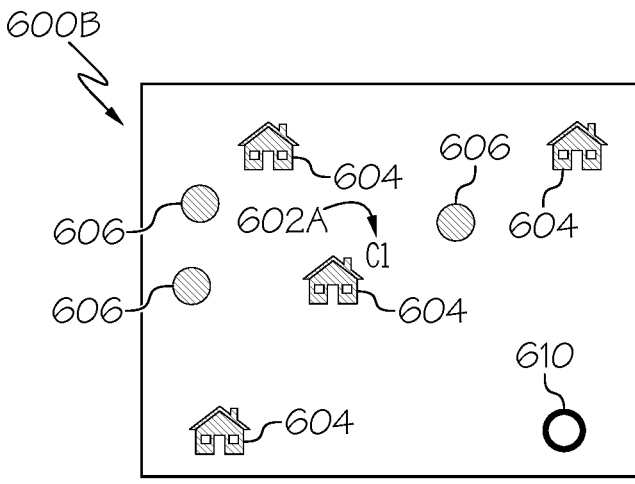
FIG. 6B depicts an entity determined to be farthest from the centroid depicted in FIG. 6A using the FN algorithm, according to one or more embodiments shown and described herein.
Figure 6C:
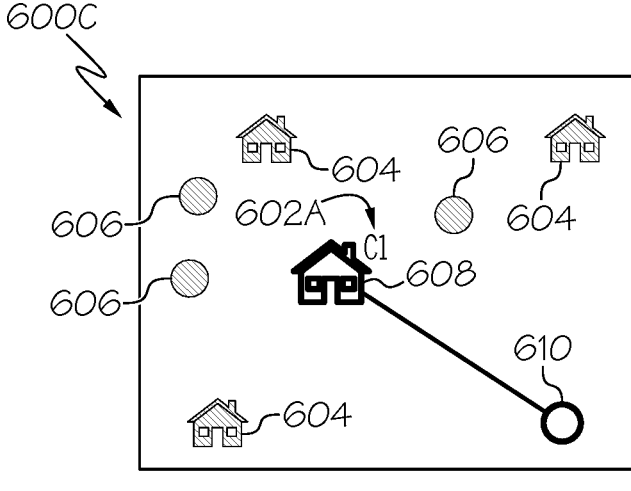
FIG. 6C depicts the farthest entity, as determined in FIG. 6B, being paired with a nearest FSL using the FN algorithm, according to one or more embodiments shown and described herein.

Referring now to FIG. 6A, the FN algorithm determines a first centroid C1 602A based upon available lead resources 604 and available entities 606 within a bin 600A. As previously discussed, the first centroid C1 602A is determined (and updated) in this embodiment based upon the mean of latitudes and longitudes of all available lead resources 604 and available entities 606 within the bin 600A. The FN algorithm in FIG. 6B designates a selected entity 610, from among the available lead resources 604 and available entities 606 within the bin 600B, that is farthest from the first centroid C1 602A. The FN algorithm in FIG. 6C designates a selected lead resource 608 as being nearest the selected entity from among the available lead resources 604 and available entities 606 within the bin 600C. The selected lead resource 608 and selected entity 610 are then paired and removed from further consideration.

Figure 6D:
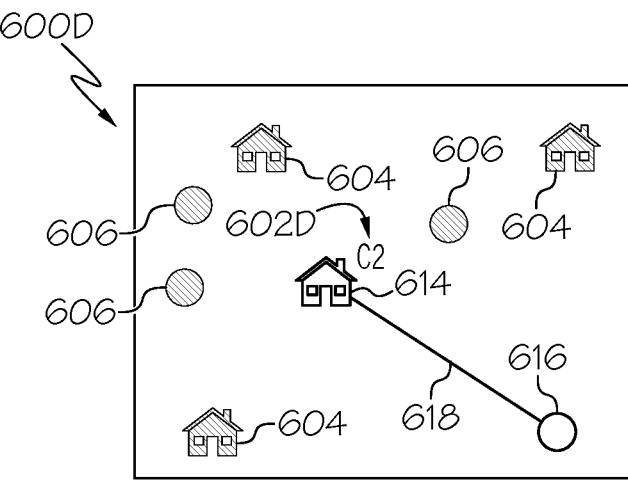
FIG. 6D depicts an updated centroid computed among the remaining FSL and entity locations using the FN algorithm by excluding the paired entity and FSL from FIG. 6C, according to one or more embodiments shown and described herein.
Figure 6E:
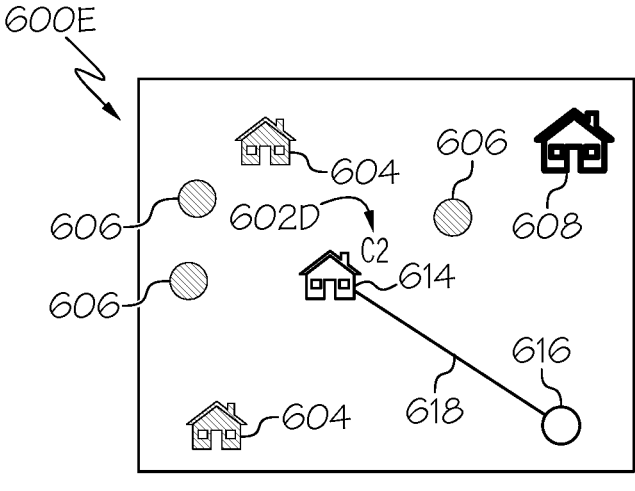
FIG. 6E depicts an entity determined to be farthest from the updated centroid depicted in FIG. 6D using the Far Near algorithm, according to one or more embodiments shown and described herein.
Figure 6F:
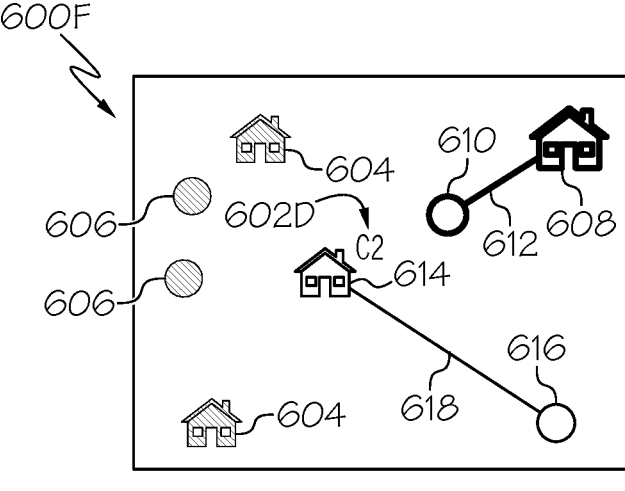
FIG. 6F depicts the farthest entity, as determined in FIG. 6E, being paired with a nearest FSL using the FN algorithm, according to one or more embodiments shown and described herein.

The FN algorithm in FIG. 6D now designates the previously-paired lead resource and entity as an established pairing 618 having an unavailable lead resource 614 and an unavailable entity 616. An updated centroid C2 602D is computed utilizing the remaining available lead resources 604 and entities 606 in the bin 600D, without consideration for the established pairing 618. Thus the updated centroid 602D has a noticeably different position with respect to the first centroid 602A that utilized all lead resources and entities. The FN algorithm in FIG. 6E designates a selected lead resource 608 in the bin 600E as being farthest from the updated centroid C2 602D, although an entity would qualify if farthest from the updated centroid 602D. The FN algorithm in FIG. 6F designates a selected entity 610 in the bin 600F as being nearest to the selected lead resource 608 to give a selected pairing 612. The FN algorithm then designates this established pairing 618 having an unavailable lead resource 614 and an unavailable entity 616.

Figure 6G:
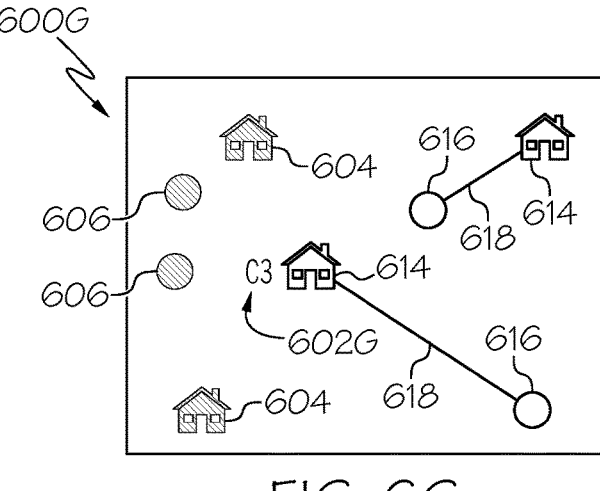
FIG. 6G depicts the paired entity and FSL from FIG. 6F as excluded from further consideration with a newly-updated centroid computed among the remaining FSL and entity locations using the FN algorithm, according to one or more embodiments shown and described herein.

The FN algorithm in FIG. 6G continues to designate the previously-paired lead resources and entities as established pairings 618 each having an unavailable lead resource 614 and an unavailable entity 616. A further updated centroid C3 602G is computed utilizing the remaining available lead resources 604 and entities 606 in the bin 600G, without consideration for the established pairings 618. Thus, the newly-updated centroid 602G has a noticeably different position with respect to the first centroid 602A and the updated centroid 602D that each utilize a greater number of available lead resources and entities.

Figure 6H:
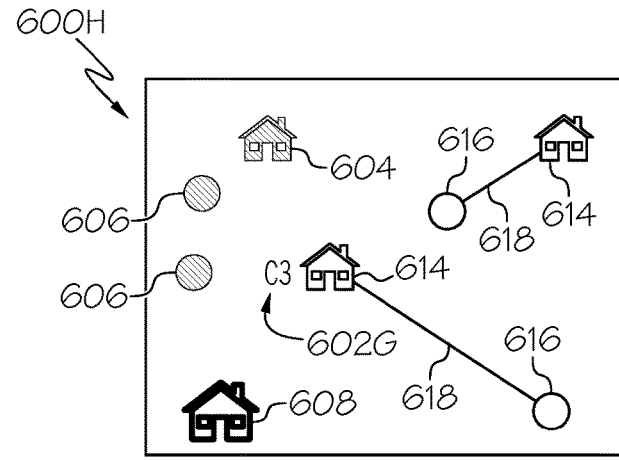
FIG. 6H depicts an entity determined to be farthest from the newly-updated centroid depicted in FIG. 6G using the FN algorithm, according to one or more embodiments shown and described herein.
Figure 6I:
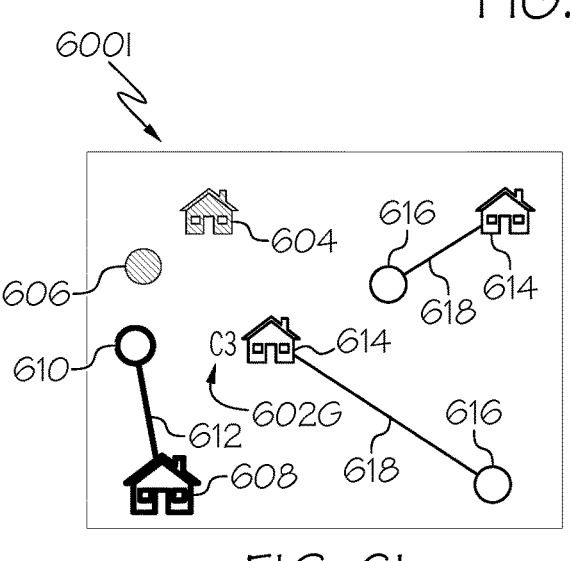
FIG. 6I depicts the farthest entity, as determined in FIG. 6H, being paired with a nearest FSL using the FNr algorithm, according to one or more embodiments shown and described herein.
Figure 6I:
Figure 6J:
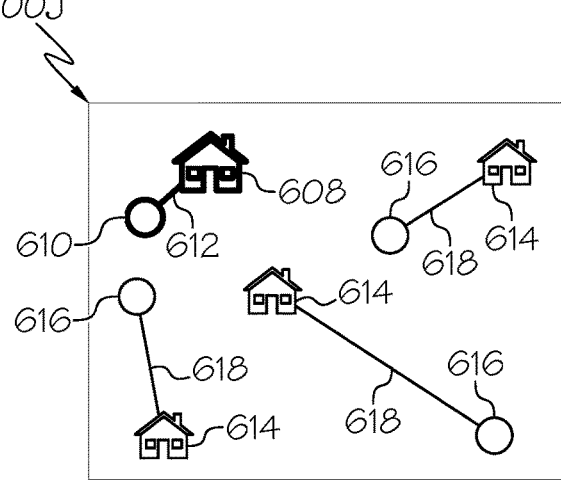
FIG. 6J depicts the last FSL-entity pair being assigned using the FN algorithm, according to one or more embodiments shown and described herein.

The FN algorithm in FIG. 6H designates a selected lead resource 608 in the bin 600H as being farthest from the updated centroid C3 602G. The FN algorithm in FIG. 6I then designates a selected entity 610 in the bin 600I as being nearest to the selected lead resource 608. The FN algorithm then designates this established pairing 618 having an unavailable lead resource 614 and an unavailable entity 616. The FN algorithm in FIG. 6J has no remaining available lead resources or entities, such that there are only established pairings 618 of unavailable lead resources 614 and unavailable entities 616.

Figure 7A:
FIG. 7A depicts a schematic illustration of instances of entities (e.g., agencies) on a map assigned to lead resources (e.g., FSLs) in a manner optimized for proximity, according to one or more embodiments shown and described herein.

Referring now to FIG. 7A, a schematic map representation 700A shows entities 702 assigned to lead resources 704, 708 in a manner optimized based upon distance/location. In this embodiment, each distance refers to the distance between a physical address or other location of a lead resource and an entity. In other embodiments, the distance may be based upon a centroid of all entities assigned to a lead resource, all entities and/or lead resources within a geographic area/region, and/or any other suitable type of distance measurement. As shown in FIG. 7A, entities 702 assigned to a lead resource 704, such as FSL5 whose location is conceptually (but not necessarily graphically) depicted as 705, are clustered together in the upper portion of the map representation 700A while another cluster to the south has entities 702 assigned to another lead resource 708, specifically lead resource 6, clustered together in the lower portion of the map representation 700A depicted by a market 707. This clustering optimizes for distance in this embodiment without regard to other factors, such as the KPI score of each entity 702. This is further reflected in the maximum distance among the entities 702 assigned to each lead resource 704, 708 as shown here in Table 2:

TABLE 2

| FSL | # of agencies | KPI mean | KPI min | KPI max | Dist mean | Dist min | Dist max |
|-----|-----|-----|-----|-----|-----|-----|-----|
| 5 | 16 | 1.34 | 0.85 | 2.16 | 39 mi | 2 mi | 64 mi |
| 6 | 23 | 3.93 | 1.03 | 9.68 | 38 mi | 2 mi | 94 mi |

Specifically, the mean distances between entities (e.g., agencies) assigned to FSL5 (39 miles) is very close to that of FSL 6 (38 miles), whose location is conceptually (but not necessarily graphically) depicted as 706. Moreover, the maximum distance of any entity 702 assigned to FSL5 is only 64 miles, and the maximum distance of any entity 702 assigned to FSL6 is only 94 miles. By contrast, the mean KPI score among the entities 702 assigned FSL5 is 1.34, which is less than half of the mean KPI score among entities 702 assigned to FSL6. Even further, the maximum KPI score among entities 702 assigned to FSL 6 is 9.68, which is more than four times higher than the highest KPI score among entities assigned to FSL5, which has only a score 2.16. This results in high geographic parity among the distances of entities 702 assigned to each lead resource 704, 708, but creates a sizable disparity among lead resources 704, 708 in terms of the KPI scores/ratings of their respective entities 702. In this embodiment, this may produce a lowest average distance among respective distances from each lead resource to an entity and a smallest variation of these respective distances within each bin (such as the schematic map representation 700A).

Figure 7B:
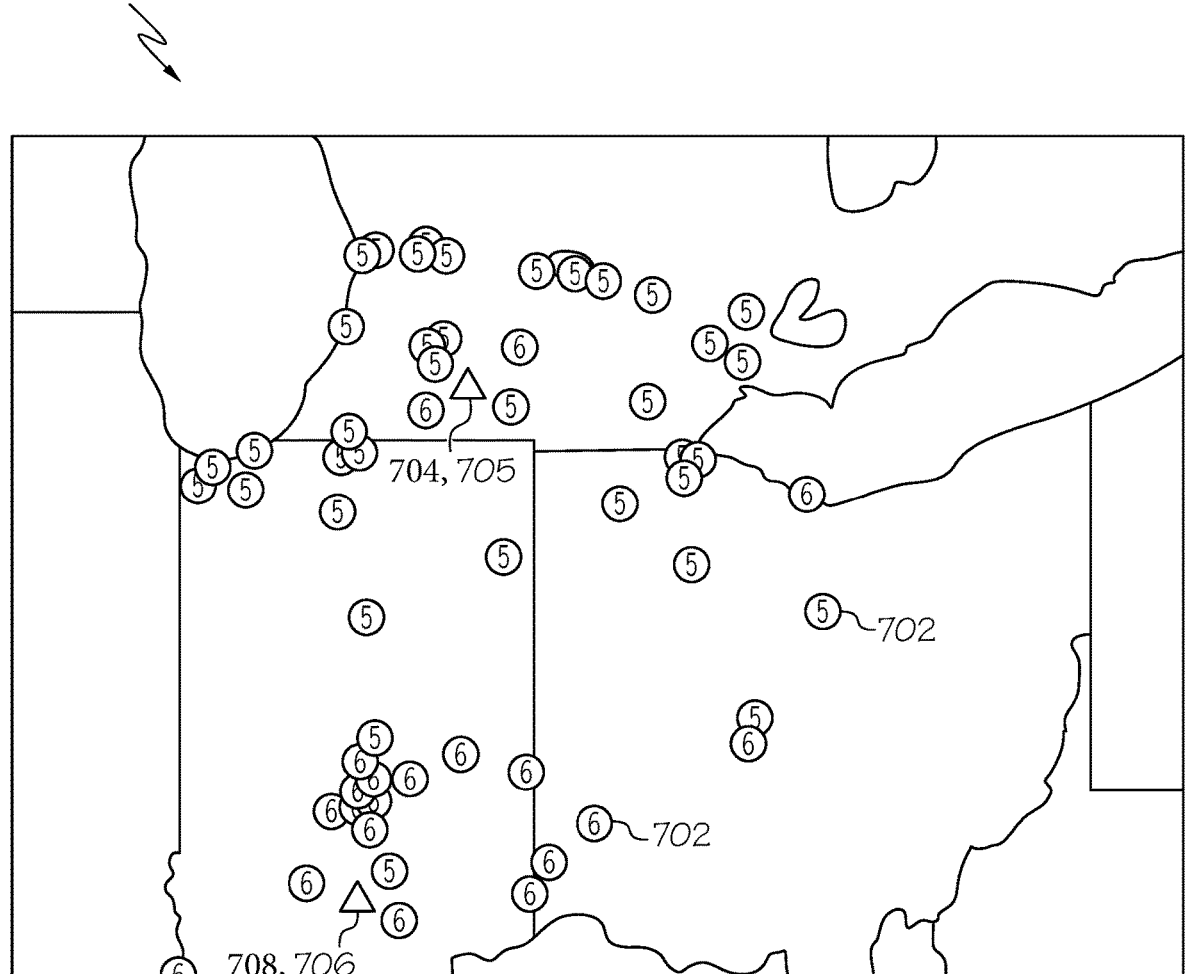
FIG. 7B depicts a schematic illustration of instances of entities (e.g., agencies) on a map assigned to lead resources (e.g., FSLs) in a manner optimized for agency scores, according to one or more embodiments shown and described herein.

Referring now to FIG. 7B, a schematic map representation 700B shows entities 702 assigned to lead resources in a manner optimized based upon entity KPI scores. As shown in FIG. 7B, entities 702 assigned to each lead resource are comingled such that there are no clearly defined clusters between entities 702 assigned to FSL5 versus FSL6. Thus, the KPI mean is used to assign entities 702 to a lead resource without regard to other factors, such as the distance of each entity 702 to a given lead resource. This is further reflected in the mean maximum among the entities 702 (e.g., agencies) assigned to each lead resource, as shown here in Table 3:

TABLE 3

| FSL | # of agencies | KPI mean | KPI min | KPI max | Dist mean | Dist min | Dist max |
|-----|-----|-----|-----|-----|-----|-----|-----|
| 5 | 21 | 3.22 | 0.85 | 9.68 | 95 mi | 29 mi | 187 mi |
| 6 | 21 | 3.34 | 1.00 | 9.31 | 75 mi | 5 mi | 164 mi |

Specifically, the mean KPI score of entities 702 assigned to FSL5 is 3.22, compared to a mean lead resource score (e.g., FSL score) of 3.34 for FSL6. Thus, the respective mean FSL scores here are far closer than the mean FSL scores (for the same FSLs and agencies) in table 2 (i.e., optimized in table 2 for distance). Moreover, there is high parity in the lowest KPI scores among all agencies assigned to FSL5 (0.85) and FSL 6 (1.00) and also among the highest KPI scores among all agencies assigned to FSL5 (9.68) and FSL6 (9.31). By contrast, the mean distance among the entities 702 assigned to FSL5 is 95 miles and the mean distance among entities 702 assigned to FSL6 is 75 miles, which is not only a significantly larger disparity between of mean distances with respect to the lead resources, but each lead resource also has a significantly higher mean distance (95 miles for FSL5 and 75 miles for FSL6) to their respective assigned entities 702 as compared to the distance optimization in table 2. Similarly, both the minimum and maximum distances for each lead resource with respect to their assigned entities 702 is much higher than the distance approach in Table 2. Moreover, there are significantly higher disparities among the lead resources with respect to the minimum and maximum distances for each lead resource (particularly the 29 miles minimum distance for FSL5 as compared with a mere 5 miles for FSL6). Thus, this approach results in higher KPI parity among the scores of entities 702 assigned to each lead resource, but creates a sizable disparity among lead resources 704, 708 in terms of the distances of their respective entities 702.

Figure 7C:
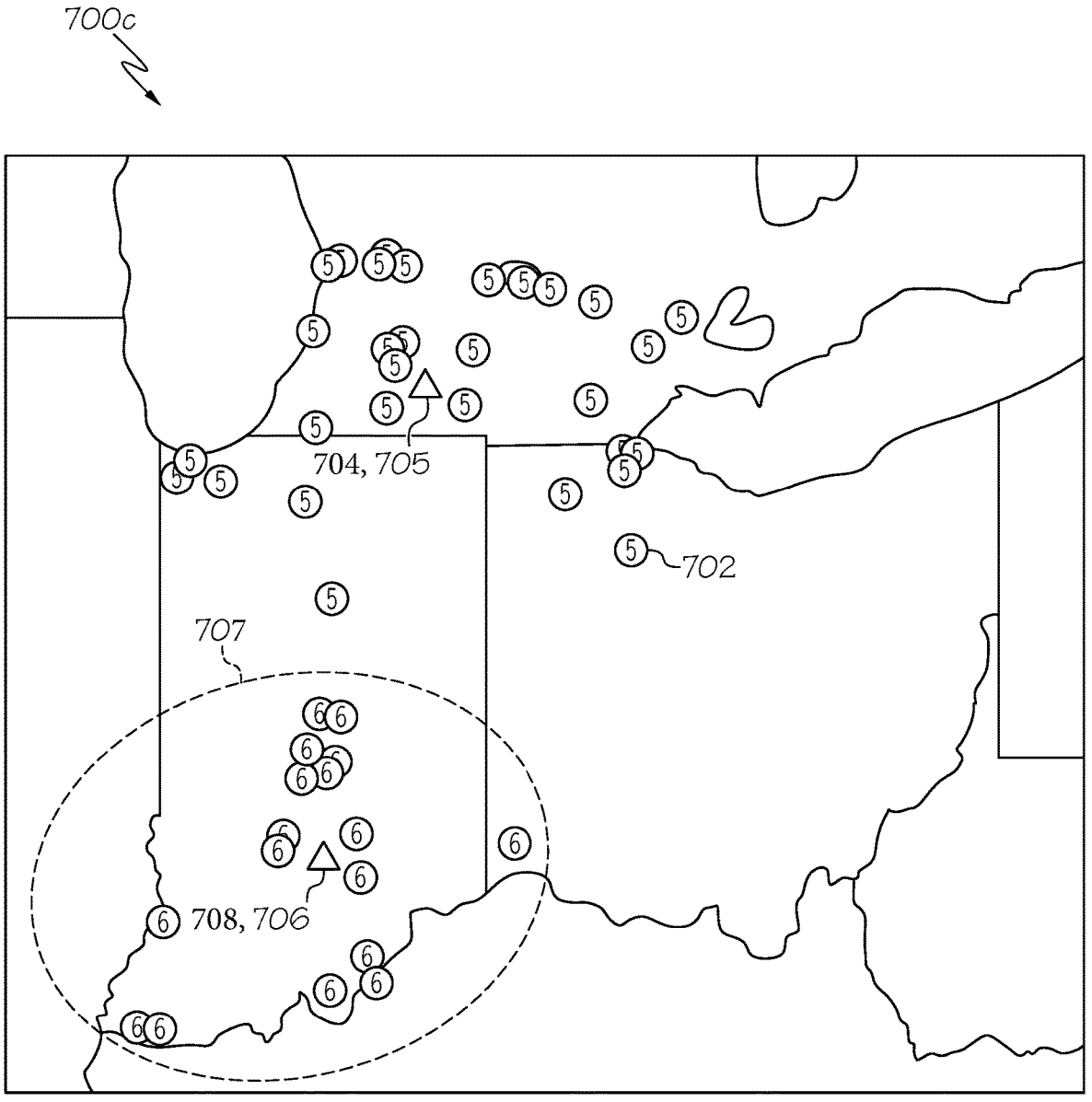
FIG. 7C depicts a schematic illustration of instances of entities (e.g., agencies) on a map assigned to lead resources (e.g., FSLs) in a manner optimized for a weighted combination of proximity and entity scores, according to one or more embodiments shown and described herein.

Referring now to FIG. 7C, a schematic map representation 700C shows entities 702 assigned to lead resources in a manner optimized based upon a weighted combination of entity locations and KPI scores. As shown in FIG. 7C, entities 702 assigned to each lead resource are more commingled than the distance-optimization approach shown in FIG. 7A, yet retain clearly-defined clusters between entities 702 assigned to FSL5 versus FSL6 as compared to the KPI score optimization approach shown in FIG. 7B. Entity KPI scores are also a factor in assigning entities 702 to a given lead resource, as shown here in Table 4:

TABLE 4

| FSL | # of agencies | KPI mean | KPI min | KPI max | Dist mean | Dist min | Dist max |
|-----|-----|-----|-----|-----|-----|-----|-----|
| 5 | 21 | 3.17 | 0.68 | 9.68 | 93 mi | 33 mi | 138 mi |
| 6 | 21 | 3.33 | 1.12 | 9.31 | 64 mi | 2 mi | 138 mi |

The KPI mean, KPI min, and KPI max shown above are in closer parity with respect to each lead resource as compared with the distance-optimized approach used in FIG. 7A, but are not as close as compared with the KPI scope-optimized approach used in FIG. 7B.

Additionally, the maximum distance between entities (e.g., agencies) assigned to each lead resource has exact parity and is significantly lower than the KPI scope-optimized approach used in FIG. 7B but is significantly higher than the distance-optimized approach used in FIG. 7A. The mean distance and minimum distance among agencies assigned to each lead resource have less parity than the distance-optimized approach used in FIG. 7A and even the KPI scope-optimized approach used in FIG. 7B. Moreover, the amount of weight that any factor, such as distance or KPI score, may be modified so that the respective influence of each factor may be adjusted. This can impact parity of any relevant values, including but not limited to KPI mean, KPI minimum, KPI maximum, mean distance, minimum distance, maximum distance, and/or any other suitable information regarding entities and/or the lead resources to which they are assigned.

Figure 8:
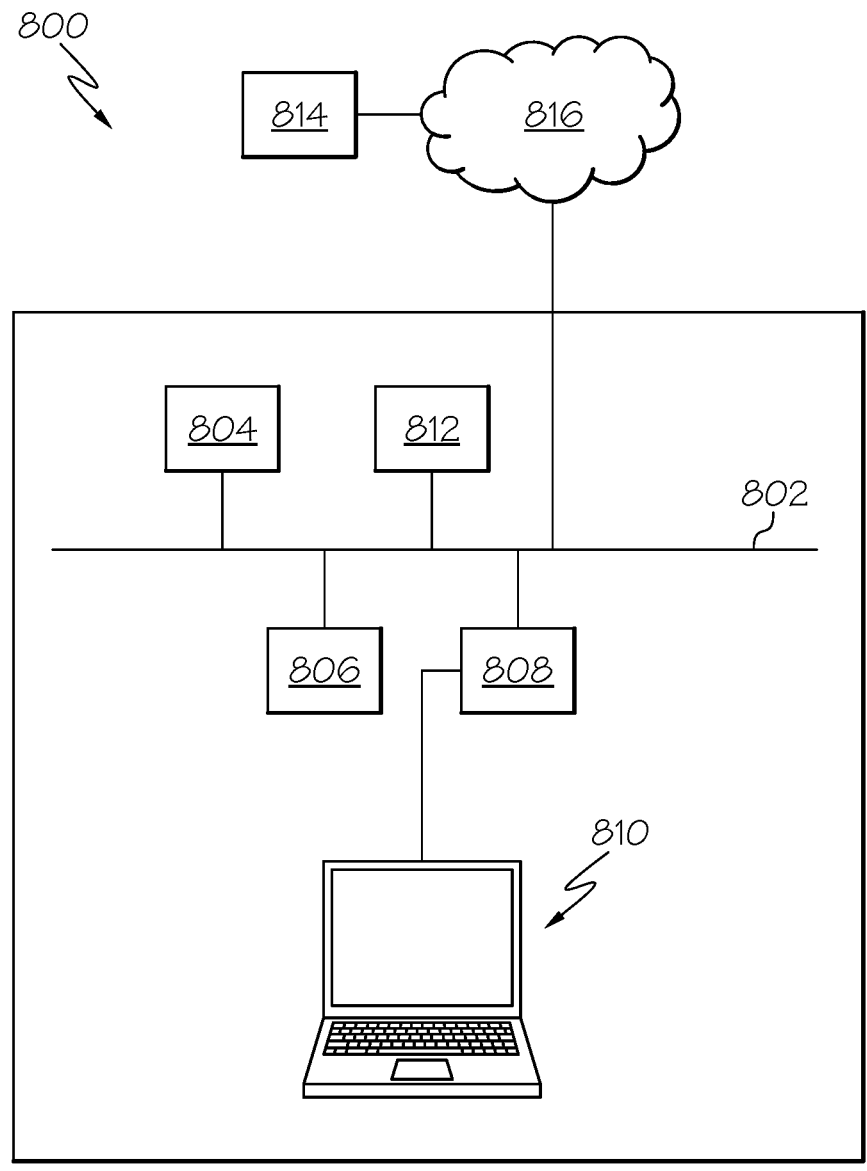
FIG. 8 depicts a schematic illustration of a computer system utilized to implement the algorithms depicted in FIGS. 2-6J and the assignments of FSL-entity assignments depicted in FIGS. 7A-7C, according to one or more embodiments shown and described herein.

FIG. 8 illustrates an entity assignment system 800 for use with the FNA algorithm flow 200 of FIG. 2, the LFNA algorithm flow 300 of FIG. 3, the NANF algorithm flow 400 of FIG. 4, the FN algorithm flow 500 of FIG. 5, and other processes described herein, such as the sequential depiction of the FN algorithm in FIGS. 6A-6J and the optimization scenarios of entity assignments in FIGS. 7A-7C, described in greater detail below. Referring to FIG. 8, a non-transitory, entity assignment system 800 is configured for implementing a computer and software-based method, such as the algorithm flows depicted in FIGS. 2-5, and the processes described herein, to assign entities to a lead resource based on the optimization algorithms as described herein. The entity assignment system 800 includes a communication path 802, one or more processors 804, a non-transitory memory component 806, an input/output controller 808, network interface hardware 812, and input/output device(s) 810 (e.g., such as displays, point devices, touch screens, etc.). In some embodiments, the entity assignment system 800 may include or be communicatively coupled to one or more remote servers 814 through a network 816. It is noted that systems according to the present disclosure may include a greater or fewer number of modules without departing from the scope of the present disclosure. The lines depicted in FIG. 8 indicate communication rather than physical connection between the various components.

An input/output device 810 of the entity assignment system 800 may include a mobile smart device, a laptop computer, a desktop computer, server computer, or the like. In embodiments, components of the entity assignment system 800 may include one or more input/output devices 810. As noted above, the entity assignment system 800 comprises the communication path 802. The communication path 802 may be formed from any medium that is capable of transmitting a signal such as, for example, conductive wires, conductive traces, optical waveguides, or the like, or from a combination of mediums capable of transmitting signals. The communication path 802 communicatively couples the various components of the entity assignment system 800. As used herein, the term "communicatively coupled" means that coupled components are capable of exchanging data signals with one another such as, for example, electrical signals via conductive medium, electromagnetic signals via air, optical signals via optical waveguides, and the like. Accordingly, communication may be facilitated through wired and/or wireless transmissions of data signals.

The entity assignment system 800 of FIG. 8 also comprises the processor 804. The processor 804 can be any device capable of executing machine-readable instructions. Accordingly, the processor 804 may be a controller, an integrated circuit, a microchip, a computer, or any other computing device. The processor 804 is communicatively coupled to the other components of the entity assignment system 800 by the communication path 802. Accordingly, the communication path 802 may communicatively couple any number of processors 804 with one another, and allow the modules coupled to the communication path 802 to operate in a distributed computing environment. Specifically, each of the modules can operate as a node that may send and/or receive data.

The illustrated entity assignment system 800 further comprises the memory component 806, which is coupled to the communication path 802 and communicatively coupled to the processor 804. The memory component 806 may be a non-transitory computer readable medium or non-transitory computer readable memory and may be configured as a nonvolatile computer readable medium. The memory component 806 may include RAM, ROM, flash memories, hard drives, or any device capable of storing machine-readable instructions such that the machine-readable instructions can be accessed and executed by the processor 804. The machine-readable instructions may include logic or algorithm(s) written in any programming language such as, for example, machine language that may be directly executed by the processor 804, or assembly language, object-oriented programming (OOP), scripting languages, microcode, etc., that may be compiled or assembled into machine-readable instructions and stored on the memory component 806. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in computer programming languages, as pre-programmed hardware elements, or as a combination of hardware and software components.

Referring again to FIG. 8, the entity assignment system 800 includes the network interface hardware 812 for communicatively coupling the entity assignment system 800 with a computer network such as network 816. The network interface hardware 812 is coupled to the communication path 802 such that the communication path 802 communicatively couples the network interface hardware 812 to other modules of the entity assignment system 800. The network interface hardware 812 can be any device capable of transmitting and/or receiving data via a wireless network. Accordingly, the network interface hardware 812 can include a communication transceiver for sending and/or receiving data according to any wireless communication standard. For example, the network interface hardware 812 can include a chipset (e.g., antenna, processors 804, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

The network 816 can include any wired and/or wireless network such as, for example, wide area networks, metropolitan area networks, the internet, an intranet, satellite networks, or the like. Accordingly, the network 816 can be utilized as an access point by the entity assignment system 800 to access one or more servers 814. The one or more servers 814 may generally comprise processors, memory, and chipset for delivering resources via the network 816. Resources can include providing, for example, processing, storage, software, and information from the one or more servers 814 to the entity assignment system 800 via the network 816. Additionally, it is noted that the one or more servers 814 and any additional servers 814 can share resources with one another over the network 816 such as, for example, via the wired portion of the network 816, the wireless portion of the network 816, or combinations thereof.

As noted above, the entity assignment system 800 may include the input/output device(s) 810 for providing output and receiving input. For example, the input/output device(s) 810 may provide visual output such as, for example, information, graphical reports, messages, or a combination thereof. The input/output device(s) 810 may be coupled to input/output controller 808 which may comprise one or more of a data port, serial bus, local wireless controller, or the like. The input/output controller 808 may couple the input/output device(s) 810 to the communication path 802 such that the input/output device(s) 810 may be communicatively coupled to the processor 804. Accordingly, the communication path 802 communicatively couples the input/output device(s) 810 to other modules of the entity assignment system 800. The input/output device(s) 810 can comprise a display comprising any medium capable of transmitting an optical output such as, for example, a cathode ray tube, light emitting diodes, a liquid crystal display, a plasma display, or the like.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that recitations herein of "at least one" component, element, etc., should not be used to create an inference that the alternative use of the articles "a" or "an" should be limited to a single component, element, etc. It is also noted that recitations herein of a component of the present disclosure being "configured" or "programmed" in a particular way, to embody a particular property, or to function in a particular manner, are structural recitations, as opposed to recitations of intended use.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

It is noted that one or more of the following claims utilize the term "wherein" as a transitional phrase. For the purposes of defining the present disclosure, it is noted that this term is an open-ended transitional term that is used to introduce a recitation of a series of characteristics of the structure and should be interpreted in like manner as the more commonly used open-ended preamble term "comprising."

ASPECTS LISTING

Aspect 1. An entity alignment system to assign an entity of a plurality of entities to a lead resource of at least two lead resources may include one or more processors, one or more memory components communicatively coupled to the one or more processors, and machine readable instructions stored in the one or more memory components. The machine readable instructions cause the entity assignment system to perform at least the following when executed by the one or more processors: receive a score for each entity of the plurality of entities, determine a ranking of the plurality of entities based upon the score for each entity, receive a distance between each entity of the plurality of entities and each lead resource of the at least two lead resources, wherein the plurality of entities are greater in number than the at least two lead resources, apply an optimization algorithm based on the ranking and the distance between each entity and each lead resource, and update the optimization algorithm in real-time until each entity of the plurality of entities is paired to one of the at least two lead resources.

Aspect 2. The entity assignment system of Aspect 1, wherein the machine readable instructions are further configured to cause the entity assignment system when executed by the one or more processors to: based on the ranking of the plurality of entities, place each entity into a plurality of bins, each bin associated with a ranking range level progressing from a highest to lowest ranking range, and apply the optimization algorithm based on the ranking range level.

Aspect 3. The entity assignment system of Aspect 1 or Aspect 2, wherein the machine readable instructions are further configured to cause the entity assignment system when executed by the one or more processors to: initiate a first iterative process as the optimization algorithm by selecting a first lead resource from the at least two lead resources at random, identify as a closest entity the entity of the plurality of entities that is closest to the first lead resource, pair the closest entity with the first lead resource, select a second lead resource from the at least two lead resources, identify as an updated closest entity the entity of the plurality of entities that is closest to the second lead resource, pair the updated closest entity with the second lead resource, and repeat the first iterative process until each of the plurality of entities is paired with at least one lead resource of the at least two lead resources.

Aspect 4. The entity assignment system of Aspect 1 or Aspect 2, wherein the machine readable instructions are further configured to cause the entity assignment system when executed by the one or more processors to: initiate a first round of a second iterative process as the optimization algorithm by setting a value L equal to a number of the at least two lead resources, select a first lead resource from the at least two lead resources at random, identify as a closest entity the entity of the plurality of entities that is closest to the first lead resource, and pair the closest entity with the first lead resource. The machine readable instructions are further configured to cause the entity assignment system when executed by the one or more processors to: select a second lead resource from the at least two lead resources, identify as an updated closest entity the entity of the plurality of entities that is closest to the second lead resource, pair the updated closest entity with the second lead resource, and repeat the second iterative process until each of the plurality of entities is paired with at least one lead resource of the at least two lead resources to generate a first round pairing result as a first of a plurality of round pairing results. The machine readable instructions are further configured to cause the entity assignment system when executed by the one or more processors to: perform a second round of the second iterative process a second time selecting the first lead resource from the at least two lead resources as a different lead resource to generate a second round pairing result as a second of a plurality of round pairing results, perform the second iterative process for L rounds until each lead resource is the first lead resource in the second iterative process to generate the plurality of round pairing results, and select a best pairing result from the plurality of round pairing results of the L rounds.

Aspect 5. The entity assignment system of any of Aspect 1 or Aspect 2, wherein the machine readable instructions are further configured to cause the entity assignment system when executed by the one or more processors to: link each lead resource to a closest entity of the plurality of entities, link each entity to a closest lead resource of the at least two lead resources, assign each pair of isolated double links based on a lead resource and an entity being mutually closest to each other, and remove each assigned pair from further consideration. In a step (i), among the remaining lead resources and entities, the optimization algorithm is configured to assign a farthest terminating node of a linked lead resource and an entity pair to each other and remove any further terminating node pair from further consideration. In a step (ii), among the non-double-linked lead resources and entities with multiple terminating nodes, the optimization algorithm is configured to assign a lead resource and an entity farthest from each other as a non-double-linked pair, remove the non-double-linked pair from further consideration, and repeat steps (i) and (ii) until each entity is assigned to one of the at least two lead resources.

Aspect 6. The entity assignment system of any of Aspect 1 or Aspect 2, wherein the machine readable instructions are further configured to cause the entity assignment system when executed by the one or more processors to: assign the plurality of entities, the at least two lead resources, or both to one or more bins based on respective scores, locations, or both, in a step (i) determine a centroid among available lead resource and entity locations within a current bin, select a lead resource of the at least two lead resources or an entity of the plurality of entities as the selected lead resource or entity farthest from the centroid, pair the selected lead resource or entity with a nearest corresponding entity or lead resource, and remove the selected lead resource or entity, the paired nearest corresponding entity or lead resource, or both, from further availability in the current bin. The optimization algorithm returns to the step (i) and repeating until there are no remaining entities or lead resources, and based upon no remaining entities or lead resources in the current bin, assigns a next bin as the current bin and return to the step (i) to repeat until no further bins remain.

Aspect 7. The entity assignment system of any of Aspect 1 to Aspect 6, wherein the optimization algorithm is optimized for proximity between entities and lead resources.

Aspect 8. The entity assignment system of any of Aspect 1 to Aspect 6, wherein the optimization algorithm is optimized for entity scores.

Aspect 9. The entity assignment system of any of Aspect 1 to Aspect 6, wherein the optimization algorithm is optimized for a weighted combination of entity scores and proximity between entities and lead resources.

Aspect 10. The entity assignment system of any of Aspect 1 to Aspect 6, wherein the optimization algorithm is further configured to reduce an average distance among respective distances from each lead resource to an entity.

Aspect 11. The entity assignment system of Aspect 10, wherein the optimization algorithm is further configured to reduce variation of these respective distances within each bin.

Aspect 12. A method of entity assignment to assign an entity of a plurality of entities to a lead resource of at least two lead resources receives a score for each entity of the plurality of entities. The method further determines a ranking of the plurality of entities based upon the score assigned to each entity, receives a distance between each entity of the plurality of entities and each lead resource of the at least two lead resources, wherein the plurality of entities are greater in number than the at least two lead resources, applies an optimization algorithm based on the ranking and a distance between each entity and each lead resource, and updates the optimization algorithm in real-time until each entity is paired to at least one of the lead resources.

Aspect 13. The method of Aspect 12, wherein the optimization algorithm comprises, based on the ranking of the plurality of entities, placing each entity into a plurality of bins, each bin associated with a ranking range level progressing from a highest to lowest ranking range, and applying the optimization algorithm based on the ranking range level.

Aspect 14. The method of any of Aspect 12 or Aspect 13, further comprising initiating a first iterative process as the optimization algorithm by selecting a first lead resource from the at least two lead resources at random, identifying as a closest entity the entity of the plurality of entities that is closest to the first lead resource, pairing the closest entity with the first lead resource, selecting a second lead resource from the at least two lead resources, identifying as an updated closest entity the entity of the plurality of entities that is closest to the second lead resource, pairing the updated closest entity with the second lead resource, and repeating the first iterative process until each of the plurality of entities is paired with at least one lead resource of the at least two lead resources.

Aspect 15. The method of any of Aspect 12 or Aspect 13, further comprising initiating a first round of a second iterative process as the optimization algorithm by setting a value L equal to a number of the at least two lead resources, selecting a first lead resource from the at least two lead resources at random, identifying as a closest entity the entity of the plurality of entities that is closest to the first lead resource, and pairing the closest entity with the first lead resource. The method further comprises selecting a second lead resource from the at least two lead resources, identifying as an updated closest entity the entity of the plurality of entities that is closest to the second lead resource, pairing the updated closest entity with the second lead resource, and repeating the second iterative process until each of the plurality of entities is paired with at least one lead resource of the at least two lead resources to generate a first round pairing result as a first of a plurality of round pairing results. The method further comprises performing a second round of the second iterative process a second time selecting the first lead resource from the at least two lead resources as a different lead resource to generate a second round pairing result as a second of a plurality of round pairing results, performing the second iterative process for L rounds until each lead resource is the first lead resource in the second iterative process to generate the plurality of round pairing results, and selecting a best pairing result from the plurality of round pairing results of the L rounds.

Aspect 16. The method of any of Aspect 12 or Aspect 13, further comprising linking each lead resource to a closest entity of the plurality of entities, linking each entity to a closest lead resource of the at least two lead resources, assigning each pair of isolated double links based on a lead resource and an entity being mutually closest to each other, and removing each assigned pair from further consideration. In a step (i), among the remaining lead resources and entities, the method further assigns a farthest terminating node of a linked lead resource and an entity pair to each other, removing any further terminating node pair from further consideration. In a step (ii), among non-double-linked lead resources and entities with multiple terminating nodes, the method further assigns a lead resource and an entity farthest from each other as a non-double-linked pair, removes the non-double-linked pair from further consideration, and repeats steps (i) and (ii) until each entity is assigned to one of the at least two resources.

Aspect 17. The method of any of Aspect 12 or Aspect 13, further comprising assigning the plurality of entities, the at least two lead resources, or both to one or more bins based on respective scores, locations, or both, in a step (i), determining a centroid among available lead resource and entity locations within a current bin, selecting a lead resource of the at least two lead resources or an entity of the plurality of entities as the selected lead resource or entity farthest from the centroid, pairing the selected lead resource or entity with a nearest corresponding entity or lead resource, removing the selected lead resource or entity, the paired nearest corresponding entity or lead resource, or both, from further availability in the current bin. The method further returns to the step (i) and repeats until there are no remaining entities or lead resources, and based upon no remaining entities or lead resources in the current bin, assigns a next bin as the current bin and returns to the step (i) to repeat until no further bins remain.

Aspect 18. The method of any of Aspect 12 to Aspect 17, wherein the optimization algorithm is optimized for proximity between entities and lead resources.

Aspect 19. The method of any of Aspect 12 to Aspect 17, wherein the optimization algorithm is optimized for entity scores.

Aspect 20. The method of any of Aspect 12 to Aspect 17, wherein the optimization algorithm is optimized for a weighted combination of entity scores and proximity between entities and lead resources.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An entity assignment system to assign an entity of a plurality of entities to a lead resource of at least ten lead resources, the entity assignment system comprising:

one or more processors;

one or more memory components communicatively coupled to the one or more processors;

machine readable instructions stored in the one or more memory components that cause the entity assignment system to perform at least the following when executed by the one or more processors:

receive a score for each entity of the plurality of entities;

determine a ranking of the plurality of entities based upon the score for each entity;

receive a distance between each entity of the plurality of entities and each lead resource of the at least ten lead resources, wherein the plurality of entities are greater in number than the at least ten lead resources, wherein the plurality of entities comprise at least one hundred entities;

apply an optimization algorithm based on the ranking and the distance between each entity and each lead resource, wherein the machine readable instructions are further configured to cause the entity assignment system when executed by the one or more processors to apply the optimization system to:

initiate a first round of a second iterative process as the optimization algorithm by implementing the second iterative process comprising:

setting a value L equal to a number of the at least ten lead resources;

selecting a first lead resource from the at least ten lead resources at random;

identifying as a closest entity the entity of the plurality of entities that is closest to the first lead resource;

pairing the closest entity with the first lead resource;

selecting a second lead resource from the at least ten lead resources;

identifying as an updated closest entity the entity of the plurality of entities that is closest to the second lead resource;

pairing the updated closest entity with the second lead resource; and update the optimization algorithm in real-time until each entity of the plurality of entities is paired to one of the at least ten lead resources, wherein the machine readable instructions are further configured to cause the entity assignment system when executed by the one or more processors to update the optimization system to:

repeat the second iterative process until each of the plurality of entities is paired with at least one lead resource of the at least ten lead resources to generate a first round pairing result as a first of a plurality of round pairing results;

perform a second round of the second iterative process a second time selecting the first lead resource from the at least ten lead resources as a different lead resource to generate a second round pairing result as a second of a plurality of round pairing results;

perform the second iterative process for L rounds until each lead resource is the first lead resource in the second iterative process to generate the plurality of round pairing results; and select a best pairing result from the plurality of round pairing results of the L rounds.

2. The entity assignment system of claim 1, wherein the machine readable instructions are further configured to cause the entity assignment system when executed by the one or more processors to:

based on the ranking of the plurality of entities, place each entity into a plurality of bins, each bin associated with a ranking range level progressing from a highest to lowest ranking range; and apply the optimization algorithm based on the ranking range level.

3. A method of entity assignment to assign an entity of a plurality of entities to a lead resource of at least ten lead resources, the method comprising:

receiving a score for each entity of the plurality of entities;

determining a ranking of the plurality of entities based upon the score for each entity;

receiving a distance between each entity of the plurality of entities and each lead resource of the at least ten lead resources, wherein the plurality of entities are greater in number than the at least ten lead resources, wherein the plurality of entities comprise at least one hundred entities;

applying an optimization algorithm based on the ranking and the distance between each entity and each lead resource, comprising:

initiating a first round of a second iterative process as the optimization algorithm by implementing the second iterative process comprising:

setting a value L equal to a number of the at least ten lead resources;

selecting a first lead resource from the at least ten lead resources at random;

identifying as a closest entity the entity of the plurality of entities that is closest to the first lead resource;

pairing the closest entity with the first lead resource;

selecting a second lead resource from the at least ten lead resources;

identifying as an updated closest entity the entity of the plurality of entities that is closest to the second lead resource;

pairing the updated closest entity with the second lead resource; and updating the optimization algorithm in real-time until each entity of the plurality of entities is paired to one of the at least ten lead resources, comprising:

repeating the second iterative process until each of the plurality of entities is paired with at least one lead resource of the at least ten lead resources to generate a first round pairing result as a first of a plurality of round pairing results;

performing a second round of the second iterative process a second time selecting the first lead resource from the at least ten lead resources as a different lead resource to generate a second round pairing result as a second of a plurality of round pairing results;

performing the second iterative process for L rounds until each lead resource is the first lead resource in the second iterative process to generate the plurality of round pairing results; and selecting a best pairing result from the plurality of round pairing results of the L rounds.

4. The method of claim 3, further comprising:

based on the ranking of the plurality of entities, placing each entity into a plurality of bins, each bin associated with a ranking range level progressing from a highest to lowest ranking range; and applying the optimization algorithm based on the ranking range level.

\* \* \* \* \*